M. CARROLL.
TAILOR'S RULE.
APPLICATION FILED JULY 27, 1912.
1,090,024.
Patented Mar. 10, 1914.
3 SHEETS—SHEET 1.
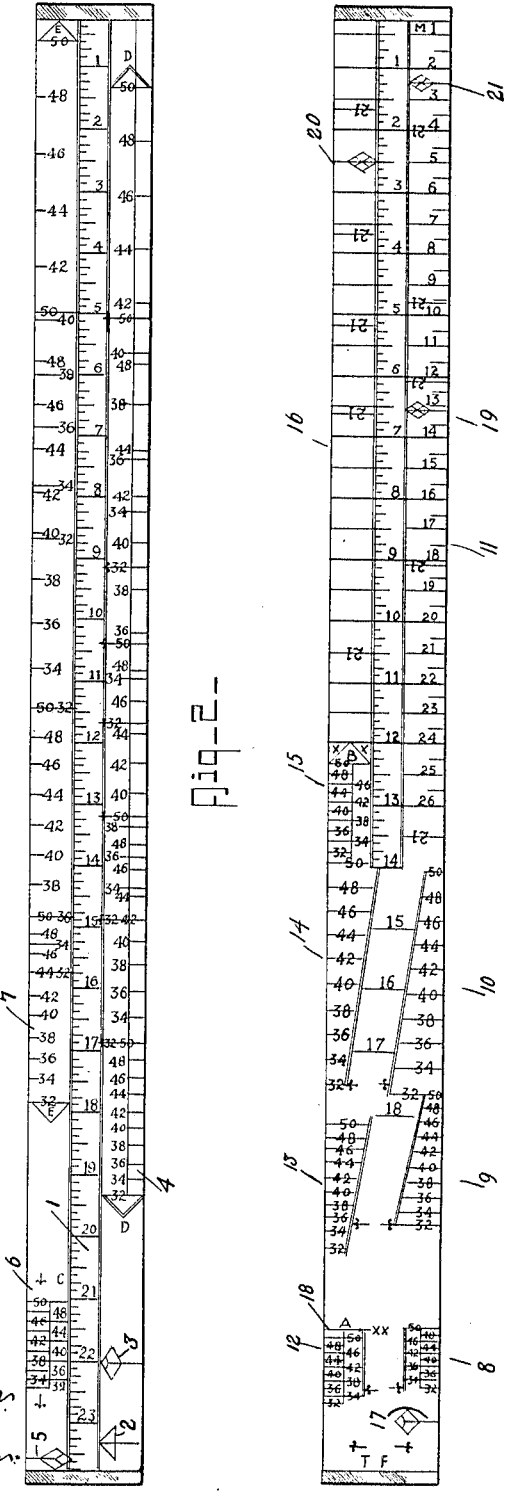
WITNESSES
Frank C. Palmer
A. L. Kitchin
INVENTOR
Morris Carroll.
BY
ATTORNEYS

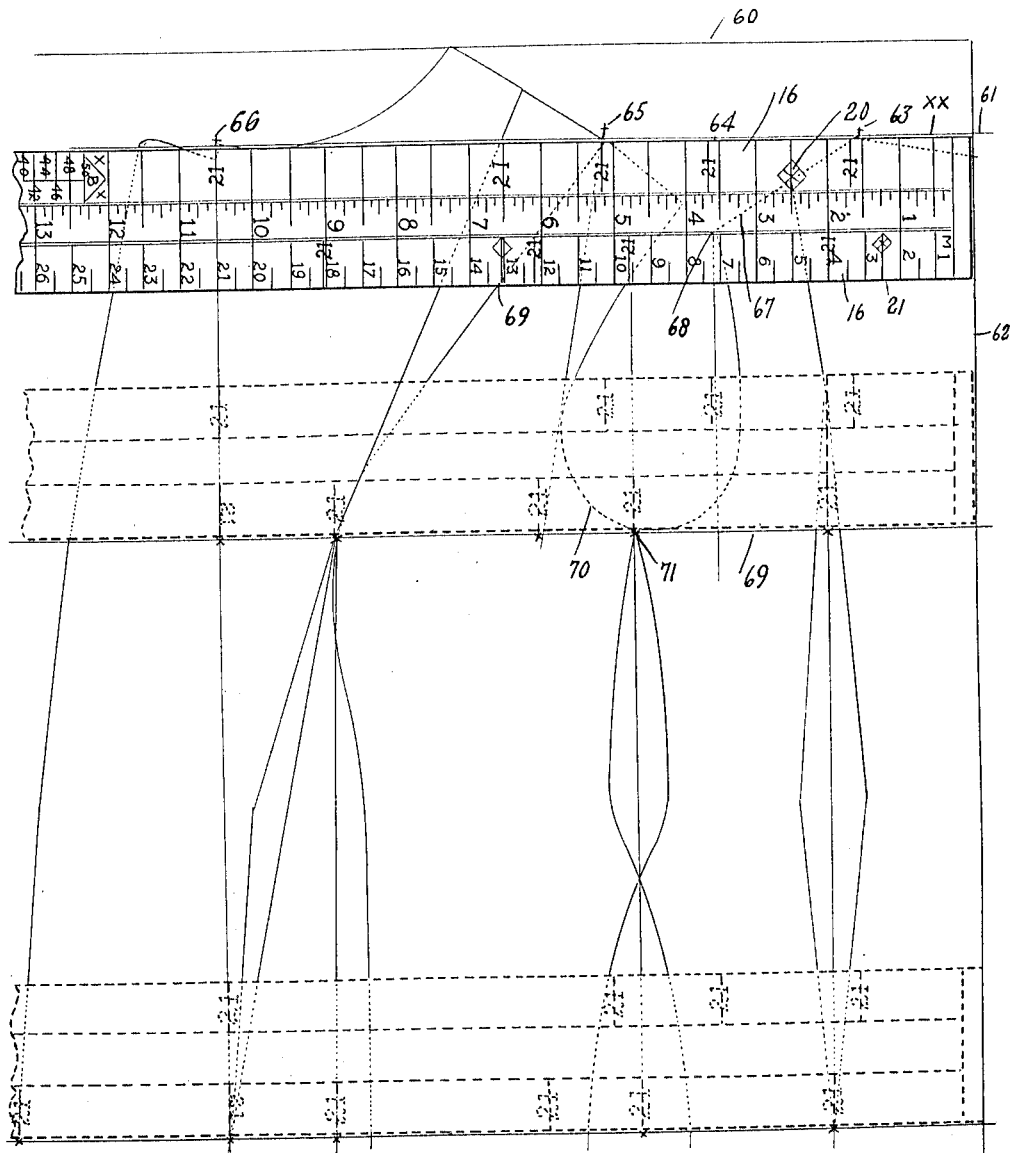

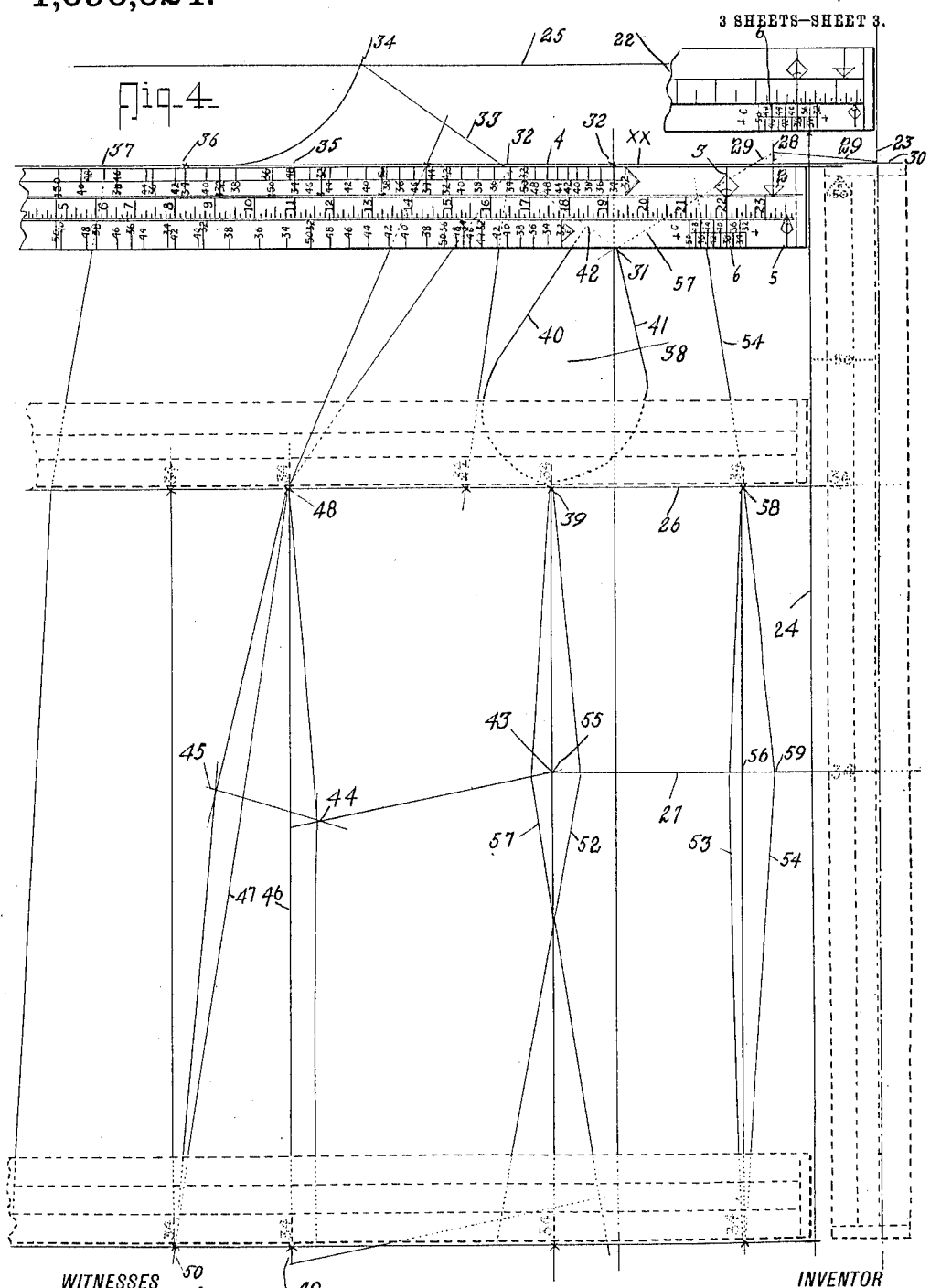

UNITED STATES PATENT OFFICE.

MORRIS CARROLL, OF NEW YORK, N. Y.

TAILOR'S RULE.

1,090,024.

Specification of Letters Patent. Patented Mar. 10, 1914.

Application filed July 27, 1912. Serial No. 711,817.

*To all whom it may concern:*

Be it known that I, MORRIS CARROLL, a citizen of the United States, and a resident of the city of New York, borough of Manhattan, in the county and State of New York, have invented a new and Improved Tailor's Rule, of which the following is a full, clear, and exact description.

This invention relates to improvements in rules, and particularly to rules for tailors' use and for ruling off garments or patterns, and has for an object to provide an improved structure in which the various measurements have been arranged in systematic order so that a proper pattern may be cut with a minimum amount of measuring.

Another object of the invention is to provide a rule in which blocks or sections of numbers are provided, arranged in different sequence for laying off garments of different sizes.

In carrying out the objects of the invention, a rule is provided of any desired length, having blocks or sections of numbers arranged thereon properly spaced apart for indicating certain measurements. These various blocks with numbers or marks arranged thereon are so correlated as to permit the rule to be used for measuring the upper edge of the garment or neck line and chest line as well as various other lines, the same numerals and indications being used on all of the lines of a certain sized garment.

A practical embodiment of the invention is represented in the accompanying drawings forming a part of this specification, in which similar characters of reference indicate corresponding parts in all the views.

Figure 1 is a plan view of an embodiment of the invention; Fig. 2 is a view of the opposite side of the rule to that shown in Fig. 1; Fig. 3 is a view of a model pattern or garment showing part of my improved rule in connection therewith; and Fig. 4 is a view similar to Fig. 3, except that the same shows a full sized pattern.

Referring to the accompanying drawings by numerals, 1 indicates a plurality of marks or graduations with suitable numerals thereon designating the usual inch indications and graduations thereof. Arranged on one side of the inch graduations are indicating spears 2 and 3. Arranged adjacent the spears 3 is a block 4 known as "Section D" which contains the various graduations properly numbered according to the particular sized jacket being outlined. These numbers run from 32 to 50 so that a jacket having a chest measurement of 32 to 50 may be properly outlined. It will be evident that a larger or smaller jacket could be outlined by carrying these numerals to a lower degree and higher degree without departing from the spirit of the invention. On the opposite side of the inch graduations is a spear 5 with a block or section 6 known as "Section C" and a block or section 7 known as "Section E." The block or section 6 is formed with proper graduations for indicating what may be known as the size line, from which all of the other measurements are taken transversely of the garment or pattern. The spear 5 is intended to indicate the distance of rise above a horizontal construction line, X X, hereinafter fully described, which is necessary when giving the proper angle to the seam which runs from the arm opening to the neck opening. On the reverse side of the rule to that shown in Fig. 1, a plurality of sections or graduations 8, 9, 10, 11, 12, 13, 14, 15, and 16 are formed for use in indicating certain measurements hereinafter fully described. Adjacent the section or block of graduations 8 is a spear 17, and adjacent the block or section of graduations 12 is a line 18 known as the "A" or "XX" line. This mark or graduation is to be used in providing the construction line XX so as to leave sufficient material above said line for allowing the extra material or rise adjacent the front neck opening of the garment. The block or section of graduations 11 and 16 are to be used in forming a model or minature garment where all the measurements are of a certain size, that given being 21. A plurality of spears 19, 20, and 21 are provided for giving certain measurements hereinafter fully described.

In order to fully disclose the construction and adaptability of the rule, a pattern has been shown in Fig. 4 with the rule applied. Referring more particularly to this figure, the rule is placed horizontally on the paper from which the pattern is to be cut, as shown by a small section 22 of the rule. It will be noticed that the end of the rule is placed parallel with the edge 23 of the paper. This pattern is shown as being made for a 34-inch chest so that from the graduation 34 found in section 6, known as "Section C"

a vertical line 24 is drawn for any desired length. The rule is then turned over until the upper edge of the rule has been placed parallel with the edge of the paper 25 and the construction line XX is drawn for any desired distance from line 24 and at right angles thereto. The lines 24 and XX are the two construction lines from which the various other measurements are taken. After these lines have been provided the rule is then placed in the position shown in Fig. 4 with one end parallel with line 24 and one edge parallel with the construction line XX. The line XX is then marked off at arrow 2 and all of the graduations 34 found in the section or block 4 known as "Section D." After this has been done the rule is moved directly downward to the dotted position shown in Fig. 4, so that the lower edge or edge opposite to the one used in connection with the double XX construction line is parallel with the chest line 26. The position of the chest line 26 is found by turning the rule to the vertical position, as shown in dotted lines in Fig. 4, and marking the pattern at the numeral 34, the block or section 7, known as "Section E" being used. When the rule is placed in the horizontal position shown in dotted lines in Fig. 4 on the chest line a mark is made on line 26 at each numeral 34 found in section 7. The waist line 27 is measured in the usual manner and is placed at the desired point on the pattern and then the rule moved downward without being otherwise changed, and the first two numerals 34 are marked on the line 27. The remaining portion of the line is marked off according to the particular measurements found necessary so as to properly fit the person for whom the pattern is being made. After the two points have been found on line 27, the rule is moved down to the end of the pattern which is usually twenty-four inches from the double XX line, though the same may be a greater or less distance. When the rule is moved down to the bottom of the pattern as shown in Fig. 4, the various points 34 are marked off. After this has been done, a vertical line is drawn from the point made by arrow 2 on the double XX line for a distance equal the distance between arrow 5 and the end of the rule, whereby point 28 is provided. Line 29 is drawn from point 30 to point 28 and then drawn to point 31. In order to find point 31 a line is drawn at right angles to line X—X from the point 32 toward the bottom of the pattern and point 31 is marked on said line a distance from point 32 equal to the distance from the end of the rule to the arrow 3. A straight line drawn from the point 31 through point 32 will intersect line 25 at point 34, as heretofore described. The line 33 drawn through point 32 extends to point 34 from the top line 35 and then curves gradually to a point near point 35 and finally merges into line XX midway between point 35 and point 36. The portion of the pattern between points 36 and 37 is for laying off a lapel and may be of any desired width. In forming the arm opening 38, a substantially arc-shaped line is drawn through point 39, this arc-shaped line being substantially semi-circular and merging into substantially straight lines 40 and 41 which extend to points 31 and 42. In forming the waist line 27 the same extends horizontally from the edge 23 to point 43 and then at an angle to point 44 and from thence at a different angle to point 45, points 44 and 45 being found by actual measurement so as to agree with the particular person for whom the garment is intended. In order to assist in finding points 44 and 45, lines 46 and 47 are provided which extend from point 48 to points 49 and 50 in a direct line. The points 44 and 45 are usually offset from substantially the center of lines 46 and 47, though this is not always the case as the offset portions must vary according to the particular shape of the person for whom the garment is being made. In order to cause a proper fit, lines 51, 52, 53, and 54 are provided which are marked out on opposite sides of points 55 and 56 according to the experience of the cutter for causing the pattern to more nearly conform to the human form. In order to assist in securing line 54, line 29 is drawn through points 28 and 31 and from the center of line 29 line 54 is drawn through point 58 and then in a slightly curved direction to point 59.

A rule embodying the invention is designed to give correctly the measurements as above indicated for cutting patterns of sizes ranging between certain limits so that only a limited amount of measurement is required to be made of the person for whom the garment is to be constructed, the measurements on the rule taking the place of the principal measurements heretofore made.

In Fig. 3 of the drawing will be seen a slightly modified form of the invention in which a model or miniature pattern is shown and in which the miniature and arbitrarily arranged numbers are shown. In this form of the device the blocks or sections 11 and 16 are used, together with the arrows 19, 20, and 21. In using the miniature or model part of the rule, the same is placed in a vertical position with the upper end of the rule parallel with the edge 60 of the paper or cloth from which the pattern is to be cut, and a construction line 61 is marked off, using the arrow 21 as a measurement for indicating the distance line 61 is to be from line 60. The rule is then turned so that the end of the same will rest against the edge 62 and then line 61 is marked off at the various graduations 21 for forming points 64, 65, and 66. A vertical line is drawn from point 64 and the distance is measured on said line from line 61 for a distance between the end of the rule and the arrow 21 and a mark is made so that line 67 may be provided, the same being drawn from point 68 to point 63. The rule is then moved to the position shown in Fig. 3 to the dotted position so as to measure the chest line 69, the chest line being first found by measuring from the line 61 to arrow 19. The various graduations 21 are then provided on line 69 and the rule is moved to the bottom of the pattern, and the graduations 21 marked on the bottom. The width of the arm opening 70 is found by measuring on each side of the point 71 for half the distance between the arrow 20 and the end of the rule. The remaining measurements and other lines necessary to be found are found in a similar manner to the preferred form shown in Fig. 4 and therefore will need no additional description.

The model or miniature after being completed is used for any desired purpose, especially for display. However, it is to be noted that the miniature is of the same proportion as the full size garment, and can therefore give the correct idea to the purchaser.

When it is desired to make a tight fitting garment instead of a loose or semi fitting garment, the end T F is placed against the construction line 24 with the edge having blocks 8, 9, and 10 parallel with the line 26. The graduations 34 are then marked off from the blocks 8, 9, and 10. The rule is moved or slid downwardly until the opposite edge is parallel with the line 27 and the graduations 34 in blocks 12, 13, 14, and 15 are used, the same numerals, namely, the graduations 34 being indicated. These blocks or sections under the portion of the rule carrying the designations TF are only used when a tight fitting garment is required.

The rule has been described in connection with two patterns in order to illustrate more clearly the construction and arrangement of the various sections or blocks of graduations formed thereon. By using the arbitrarily arranged graduations and the selected measurements provided by actually measuring the person for whom the garment is to be made, a proper fitting garment may be correctly marked off without resorting to guessing sizes and shapes as was done in many instances heretofore.

Having thus described my invention I claim as new and desire to secure by Letters Patent:—

1. A rule provided with a scale formed with size graduations, a second scale on the same side of the rule and on the opposite edge thereof having graduations correlated with the graduations on the first mentioned scale adapted to indicate by the same numbers the desired position of points on a chest line, a transverse line arranged near one end of said ruler for indicating the position of a horizontal construction line, and a block of numbered graduations arranged on the same end of said rule but on the opposite face thereof for indicating the position of a vertical construction line.

2. A rule provided with a block of graduations arranged on one side at one end, said graduations being numbered for indicating the position of a vertical construction line commensurate with the size of the pattern being marked off, a scale arranged on the same side of said rule as said block of graduations but on the opposite edge thereof, said scale being formed with numbers corresponding with the numbers on said block of graduations, and a second scale arranged on the opposite edge of said rule to said first mentioned scale, said second mentioned scale being formed with numbers corresponding to the numbers on said block of graduations and the numbers on said first mentioned scale, said second mentioned scale being used for determining the position of the chest line of the pattern being made.

In testimony whereof I have signed my name to this specification in the presence of two subscribing witnesses.

MORRIS CARROLL.

Witnesses:
A. L. KITCHIN,
JOHN P. DAVIS.

Copies of this patent may be obtained for five cents each, by addressing the "Commissioner of Patents, Washington, D. C."